(12) United States Patent
Chiu et al.

(10) Patent No.: US 11,847,857 B2
(45) Date of Patent: Dec. 19, 2023

(54) VEHICLE DEVICE SETTING METHOD

(71) Applicant: PixArt Imaging Inc., Hsin-Chu County (TW)

(72) Inventors: Liang-Chi Chiu, Hsin-Chu County (TW); Yu-Han Chen, Hsin-Chu County (TW); Ming-Tsan Kao, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 162 days.

(21) Appl. No.: 17/534,870

(22) Filed: Nov. 24, 2021

(65) Prior Publication Data

US 2022/0083765 A1    Mar. 17, 2022

Related U.S. Application Data

(60) Continuation of application No. 16/252,769, filed on Jan. 21, 2019, now Pat. No. 11,222,197, which is a division of application No. 14/047,682, filed on Oct. 7, 2013, now abandoned.

(30) Foreign Application Priority Data

Oct. 22, 2012  (TW) ................. 101138995

(51) Int. Cl.
*G06V 40/16* (2022.01)
*B60R 25/25* (2013.01)
*G06V 20/59* (2022.01)

(52) U.S. Cl.
CPC ............ *G06V 40/174* (2022.01); *B60R 25/25* (2013.01); *G06V 20/59* (2022.01); *G06V 2201/10* (2022.01)

(58) Field of Classification Search
CPC ................ B60R 25/25; G06K 2209/27; G06K 9/00302; G06K 9/00832
See application file for complete search history.

(56) References Cited

U.S. PATENT DOCUMENTS

| | | | |
|---|---|---|---|
| 2007/0061152 A1* | 3/2007 | Doi ........................ | G10L 15/26 704/277 |
| 2012/0148117 A1* | 6/2012 | Chang .................... | G06V 40/50 382/118 |

OTHER PUBLICATIONS

Nissan Maxima 2007 Reference Guide (Year: 2007).*

* cited by examiner

*Primary Examiner* — Mark Roz
(74) *Attorney, Agent, or Firm* — WPAT, P.C.

(57) ABSTRACT

A vehicle device setting method including: capturing, by an image sensing unit, a first image frame; recognizing a user ID according to the first image frame; showing ID information of the recognized user ID on a screen or by a speaker; capturing a second image frame; generating a confirm signal when a first user expression is recognized by calculating an expression feature in the second image frame and comparing the recognized expression feature with stored expression data associated with a predetermined user expression to confirm whether the recognized user ID is correct or not according to the second image frame captured after the ID information is shown; controlling an electronic device according to the confirm signal; and entering a data update mode instructed by the user and updating setting information of the electronic device by current electronic device setting according to a saving signal generated by confirming a second user expression in a third image frame captured after the user ID is confirmed through showing the ID information.

10 Claims, 5 Drawing Sheets

VEHICLE DEVICE SETTING METHOD

CROSS REFERENCE TO RELATED APPLICATION

This application is a continuation application of U.S. Ser. No. 16/252,769, filed on Jan. 21, 2019, which is a divisional application of U.S. application Ser. No. 14/047,682, filed on Oct. 7, 2013, which claims the priority benefit of Taiwan Patent Application Serial Number 101138995, filed on Oct. 22, 2012, the full disclosure of which is incorporated herein by reference.

BACKGROUND

1. Field of the Disclosure

This disclosure generally relates to an interactive system and, more particularly, to a user recognition and confirmation device and method, and a central control system for vehicles using the same.

2. Description of the Related Art

Presently the biological recognition technology has been widely applied to the ID recognition. Generally biological information includes the information of, for example, face, voice print, finger print and pupil, wherein in the face recognition as a user does not need to take any corresponding action, it is the most convenient technology for operation.

For example, World Patent No. WO2011/121688 discloses a face recognition device which includes an image capture unit, a region detection unit, a feature value extraction unit, a distance estimation unit and a feature value update unit. The region detection unit is for detecting a predetermined region in the image captured by the image capture unit. The feature value extraction unit is for extracting a feature value of the predetermined region. The distance estimation unit is for estimating a distance between the image capture unit and the predetermined region. The feature value update unit is for updating the feature value according to the distance. As a result, it is able to realize high recognition accuracy.

The expression recognition technology is a new technology in development that is able to detect different facial expressions in different moods, such as anger, terror, dislike, happiness, expressionless, sadness, surprise and so on. For example, U.S. Patent Pub. No. 2012169895 discloses a method and apparatus for capturing facial expressions that employ a recognizer implemented by using a Hierarchical Temporal Memory (MTM) recognizer. The method recognizes a target image so as to obtain an expression status and can be applied to the image capturing devices such as a digital camera, Web Cam, IP Cam or Monitor camera.

Accordingly, the present disclosure provides a user recognition and confirmation device and method, and a central control system for vehicles using the same that may recognize a user ID at first by using a face recognition unit and then confirm the accuracy of the user ID through an expression recognition unit. In this manner, the user may accomplish the recognition and the confirmation procedures without using body motion.

SUMMARY

The present disclosure provides a user recognition and confirmation device and method, and a central control system for vehicles using the same that may recognize the user ID using face recognition technology and confirm the user ID using expression recognition technology.

The present disclosure further provides a user recognition and confirmation device and method, and a central control system for vehicles using the same that may be applied to automatic settings of various electronic devices for vehicles.

The present disclosure provides a vehicle device setting method including the steps of: capturing, by an image sensing unit, a first image frame; recognizing a user ID according to the first image frame; showing ID information of the recognized user ID on a screen; capturing, by the image sensing unit, a second image frame; generating a confirm signal when a first user expression is recognized by calculating an expression feature in the second image frame and comparing the recognized expression feature with stored expression data associated with a predetermined user expression to confirm whether the recognized user ID is correct or not according to the second image frame captured after the ID information is shown on the screen; controlling an electronic device according to the confirm signal; and entering a data update mode instructed by the user and updating setting information of the electronic device by current electronic device setting according to a saving signal generated by confirming a second user expression in a third image frame captured by the image sensing unit after the user ID is confirmed through showing the ID information on the screen.

The present disclosure further provides a vehicle device setting method including the steps of: capturing, by an image sensing unit, a first image frame; recognizing a user ID according to the first image frame; playing ID information of the recognized user ID by a speaker; capturing, by the image sensing unit, a second image frame; generating a confirm signal when a first user expression is recognized by calculating an expression feature in the second image frame and comparing the recognized expression feature with stored expression data associated with a predetermined user expression to confirm whether the recognized user ID is correct or not according to the second image frame captured after the ID information is played by the speaker; controlling an electronic device according to the confirm signal; and entering a data update mode instructed by the user and updating setting information of the electronic device by current electronic device setting according to a saving signal generated by confirming a second user expression in a third image frame captured by the image sensing unit after the user ID is confirmed through playing the ID information by the speaker.

In one aspect, the face recognition unit may be further configured to identify whether there is a user existing in the first image frame and/or identify a user to be recognized within a plurality of users in the first image frame.

In one aspect, the user recognition and confirmation device further includes a storage unit configured to save ID information of at least one user, expression data associated with the user expression and setting information.

In one aspect, the display unit may show the ID information via screen and/or sound.

In one aspect, the user recognition and confirmation method further includes the steps of: capturing a third image frame with the image sensing unit; confirming a user expression according to the third image frame and generating a saving signal; and updating setting information of the at least one electronic device according to the saving signal.

In the user recognition and confirmation device and method, and the central control system for vehicles of the present disclosure, the user ID may be automatically confirmed through a user expression not through body motion of the user. In addition, when the user desires to update the setting information, the updating may also be implemented through the expression recognition.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
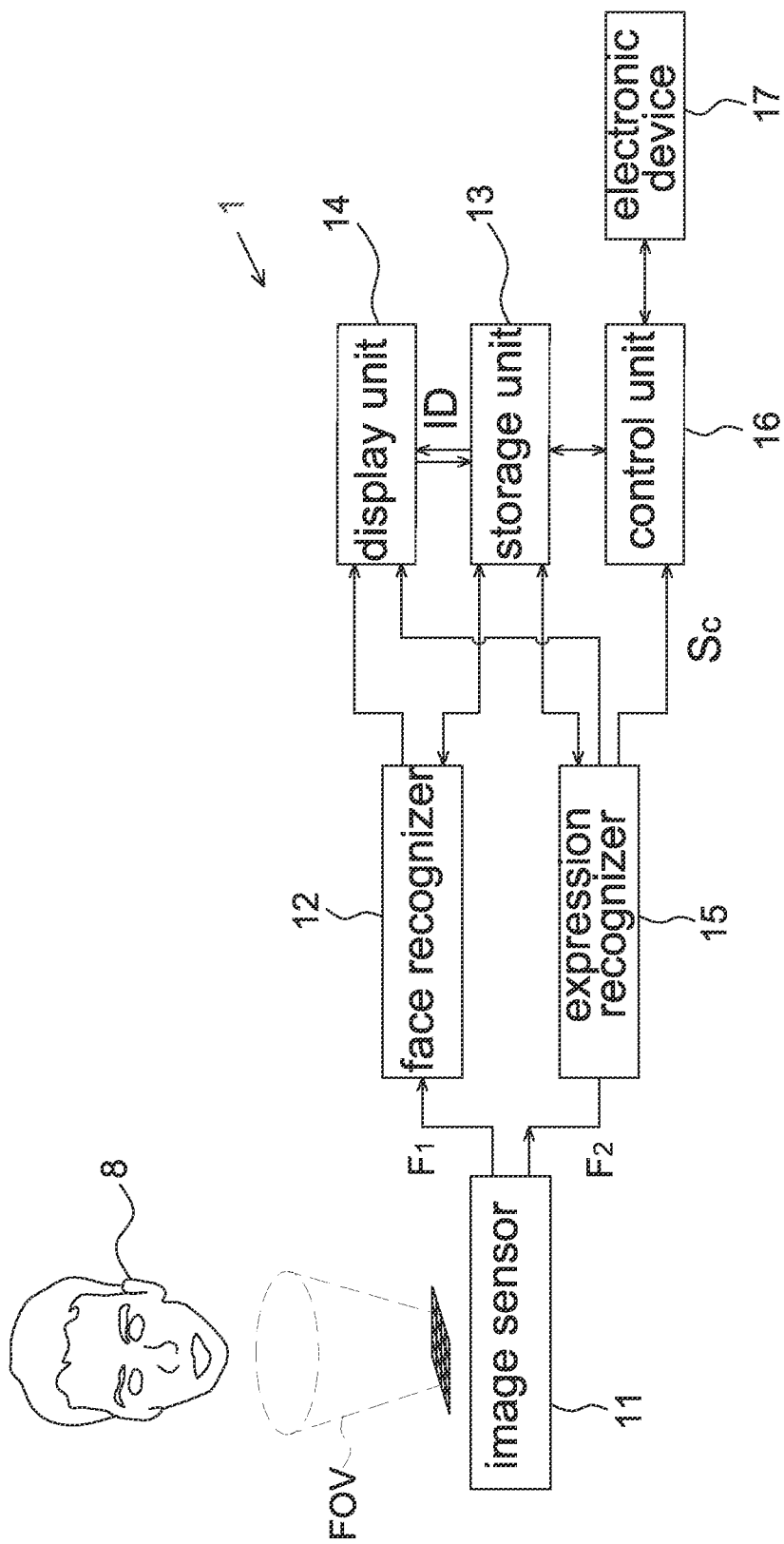
FIG. 1 shows a schematic block diagram of the user recognition and confirmation device according to an embodiment of the present disclosure.

Referring to FIG. 1, it shows a schematic block diagram of the user recognition and confirmation device according to an embodiment of the present disclosure. The user recognition and confirmation device 1 includes an image sensing unit 11, a face recognition unit 12, a storage unit 13, a display unit 14, an expression recognition unit 15, a control unit 16 and an electronic device 17. In this embodiment, the face recognition unit 12, the expression recognition unit 15 and the control unit 16 may be implemented by processors capable of processing digital data such as a digital signal processor (DSP), and the face recognition algorithm and expression recognition algorithm may be previously built in the digital signal processor.

The user recognition and confirmation device 1 according to the embodiment of the present disclosure is configured to recognize a user ID at first and then confirm whether the user ID is correct or not according to a user expression so as to accordingly control at least one electronic device 17. In one embodiment, the user recognition and confirmation device 1 may be applied to a central control system for vehicles so as to perform corresponding driver settings according to the use habit of every driver, wherein the driver settings may include a seat position, a mirror angle, an air conditioner temperature, an audio setting, a steering wheel height, a light setting and a GPS (global positioning system) setting, but not limited to. However, the user recognition and confirmation device 1 according to the embodiment of the present disclosure in not limited to be applied to the central control system for vehicles. It may be applied to any human-machine interface system that may perform the confirmation of the recognized user ID according to the facial expression of the user.

The image sensing unit 11 may be a CCD image sensor, a CMOS image senor or the like. The image sensing unit 11 is configured to capture a first image frame F1 and a second image frame F2, wherein the image sensing unit 11 may capture images at a fixed capturing frequency. For example in FIG. 1, the image sensing unit 11 captures images of a user 8 with a field of view (FOV).

The face recognition unit 12 is configured to recognize a user ID according to the first image frame F1, wherein after the face feature(s) is calculated using algorithm, the face recognition unit 12 searches the corresponding user ID in the storage unit 13 and transmits the searched user ID to the display unit 14 for displaying. It is appreciated that the face recognition unit 12 may start to recognize the user ID only when the first image frame F1 includes a face image.

Figure 2:
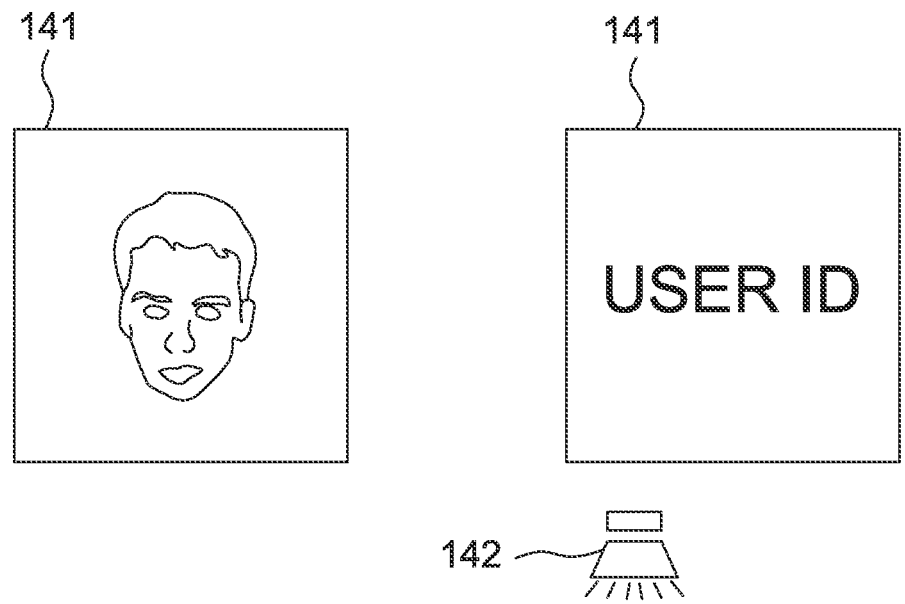
FIG. 2 shows a schematic diagram of the ID information shown by the display unit of the user recognition and confirmation device according to the embodiment of the present disclosure.

The display unit 14 may be, for example, a liquid crystal display and has a display screen 141 and/or a speaker 142 as shown in FIG. 2 for showing ID information of the user ID. The display unit 14 may also be other types of display. In this manner, the display unit 14 may show the ID information via screen and/or sound, wherein the screen may show the user's picture, drawing or words without any limitation.

The expression recognition unit 15 is configured to confirm a user expression according to the second image frame F2 and output a confirm signal Sc, wherein after the expression feature(s) is calculated using algorithm, the expression recognition unit 15 searches the expression data associated with the user expression in the storage unit 13 for comparison. In other words, the storage unit 13 may previously save ID information of at least one user and the expression data associated with the user expression. In the embodiment of the present disclosure, said user expression is preferably a happiness expression, but not limited to. The user expression may be set according to different users, e.g. anger, terror, dislike, surprise, sadness or expressionless.

The control unit 16 may control a setting of at least one electronic device 17 according to the confirm signal Sc, wherein the setting is associated with the user ID and may be set by the related user himself or herself. The setting may be the operational setting of the electronic device 17, e.g. operational strength, operational interval and/or operational directivity, and previously saved in the storage unit 13, wherein the setting may be different according to different electronic devices 17.

As mentioned above, as the second image frame F2 is for the confirmation of a user ID of the user 8, the image sensing unit 11 may capture the second image frame F2 after the display unit 14 has shown the ID information. However, the present disclosure is not limited that the image sensing unit 11 stops its operation in a time interval after the image sensing unit 11 capturing the first image frame F1 and before the display unit 14 showing the ID information. According to different applications the image sensing unit 11 may continuously operate or be disabled after the first image frame F1 is captured till the expression recognition unit 15 recognizes the user expression.

In one embodiment, the image sensing unit 11 starts to operate to continuously capture the first image frame F1 after the starting procedure of the user recognition and confirmation device 1 is accomplished. Therefore, preferably the face recognition unit 12 may be further configured to identify whether there is a user 8 existing in the first image frame F1. When there is no user image in the first image frame F1, a new first image frame F1 is captured. When there is a user image existing in the first image frame F1, the face recognition unit 12 starts to recognize a user ID according to the first image frame F1.

In one embodiment, the face recognition unit 12 may be further configured to identify a user to be recognized within a plurality of users in the first image frame F1. For example, when a plurality of user images are existing in the first image frame F1 simultaneously, the face recognition unit 12 may select a closest user as the user to be recognized, wherein said closest may be identified according to the size, contrast and clearness of the user image. In addition, the user to be recognized may also be identified according to other ways, e.g. the position of the user image. After the user to be recognized is identified, the face recognition unit 12 starts to perform the user ID recognition. In addition, the user recognition unit 12 may also perform the user ID recognition on all of the plurality of users and show the recognized results on the display unit 14 simultaneously. Then, the user 8 may confirm the ID information of a user to be recognized via the expression recognition unit 15.

Figure 3:
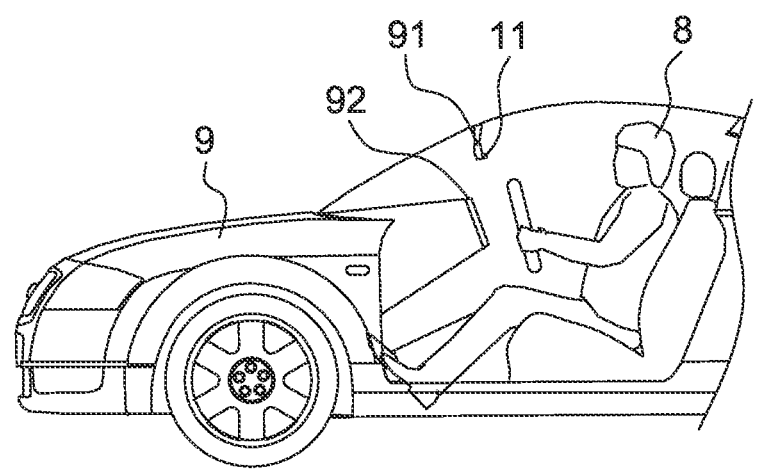
FIG. 3 shows a schematic diagram of the central control system for vehicles to which the user recognition and confirmation device according to the embodiment of the present disclosure applies.

For example, when the user recognition and confirmation device 1 is applied to a central control system for vehicles as shown in FIG. 3, the image sensing unit 11 is preferably disposed opposite to a driver seat. For example, the image sensing unit 11 may be disposed on a rear view mirror 91 or on a central control panel 92, but not limited to. It may also be disposed at any suitable position as long as the driver's face image can be captured.

Referring to FIGS. 1 and 3, a central control system for vehicles employing the user recognition and confirmation device 1 of the present disclosure includes the image sensing unit 11, the face recognition unit 12, the storage unit 13, the display unit 14, the expression recognition unit 15 and the control unit 16. The image sensing unit 11 is configured to capture the first image frame F1 and the second image frame F2. The face recognition unit 12 is configured to recognize a user ID according to the first image frame F1. The display unit 14 is configured to show ID information of the user ID. The expression recognition unit 15 is configured to confirm a user expression according to the second image frame F2 and output a confirm signal Sc. The control unit 16 is configured to read the driver setting associated with the user ID according to the confirm signal Sc. In this embodiment, in addition to that the setting is related to the driver setting, e.g. the setting(s) of the electronic device including at least one of a seat, a mirror, an air conditioner, an audio equipment, a steering wheel, a light and a GPS system, other operations are similar to those of FIG. 1 and corresponding descriptions, and thus details thereof are not repeated herein. Therefore, in this embodiment the storage unit 13 at least saves the ID information of at least one user, the expression data associated with the user expression and the driver setting(s) associated with different electronic devices for vehicles.

In addition, the user recognition and confirmation device 1 of the present disclosure may also be able to update the setting information of at least one electronic device according to the user expression. A central control system for vehicles is still used as an example herein, for example the image sensing unit 11 may capture a third image frame and the expression recognition unit 15 may confirm a user expression according to the third image frame and generate a saving signal to the control unit 16. The control unit 16 then saves the current setting information of the at least one electronic device into the storage unit 13 according to the saving signal so as to update the setting information, e.g. updating at least one of a seat position, a mirror angle, an air conditioner temperature, an audio setting, a steering wheel height, a light setting and a GPS setting. It is appreciated that the step of updating the setting information may be performed when a data update mode is entered, and the data update mode may be entered according to an instruction from the user or directly entered after the expression recognition unit 15 finishes the confirmation of the ID information without any limitation.

Figure 4:
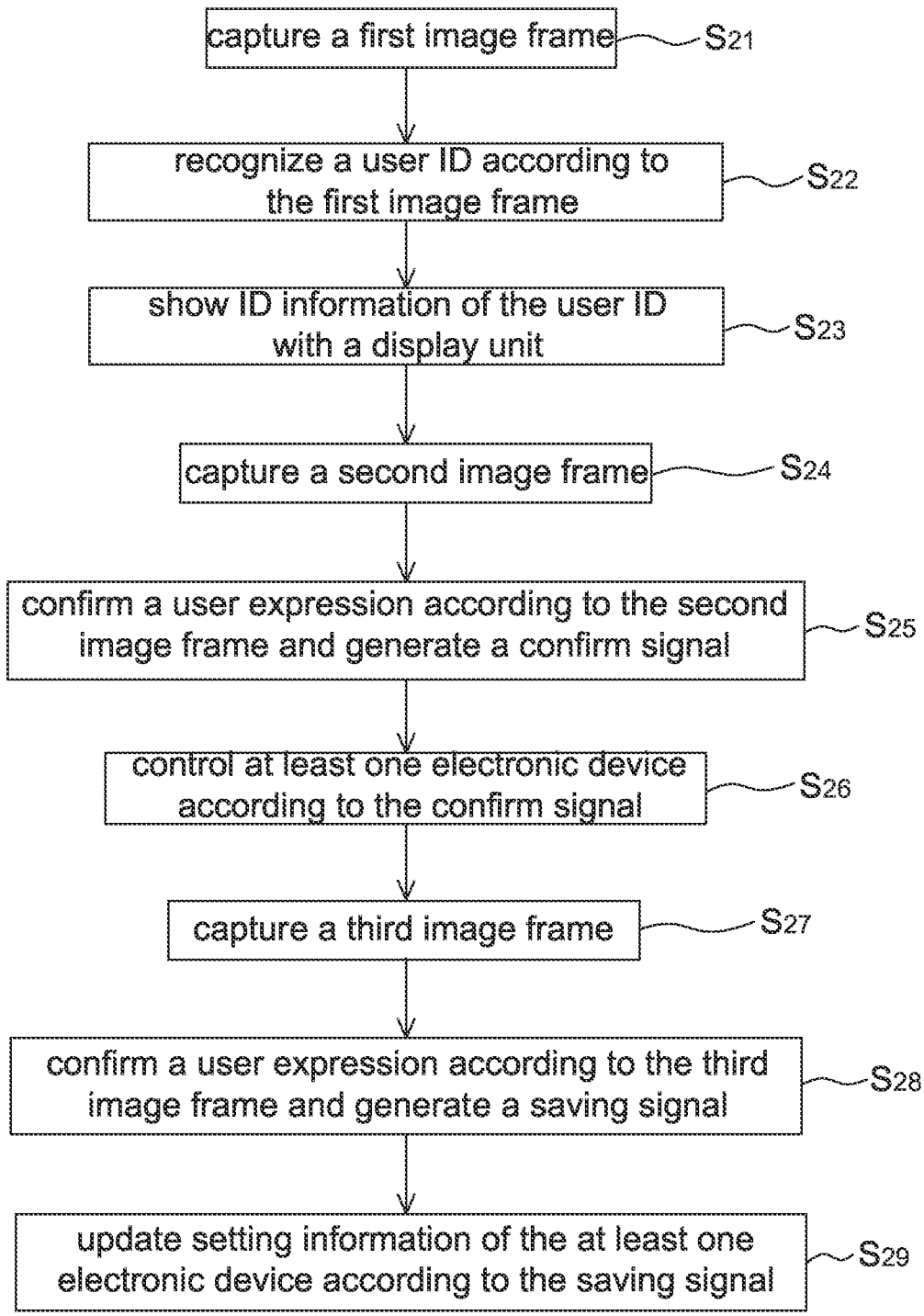
FIG. 4 shows a flow chart of the user recognition and confirmation method according to an embodiment of the present disclosure.

Referring to FIG. 4, it shows a flow chart of the user recognition and confirmation method according to the embodiment of the present disclosure, which includes the steps of: capturing a first image frame with an image sensing unit (Step $S_{21}$); recognizing a user ID according to the first image frame (Step $S_{22}$); showing ID information of the user ID with a display unit (Step $S_{23}$); capturing a second image frame with the image sensing unit (Step $S_{24}$); confirming a user expression according to the second image frame and generating a confirm signal (Step $S_{25}$); controlling at least one electronic device according to the confirm signal (Step $S_{26}$); capturing a third image frame with the image sensing unit (Step $S_{27}$); confirming a user expression according to the third image frame and generating a saving signal (Step $S_{28}$); and updating setting information of the at least one electronic device according to the saving signal (Step $S_{29}$); wherein when the user recognition and confirmation method of this embodiment is applied to a central control system for vehicles, said electronic device may be at least one of a seat, a mirror, an air conditioner, an audio equipment, a steering wheel, a light and a GPS system, but not limited to. Details of every step of this embodiment have been described in FIGS. 1 and 3 and corresponding descriptions and thus they are not repeated herein. FIG. 4 describes an embodiment of the performing sequence of every step.

Figure 4A:
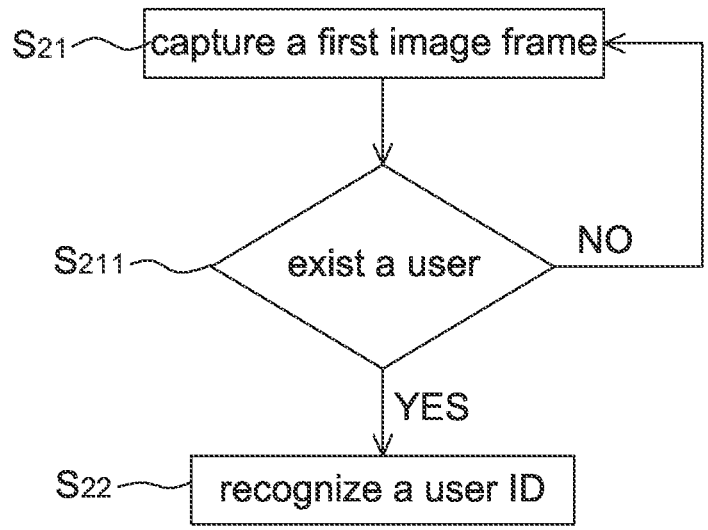
FIGS. 4A to 4B respectively show another flow chart of the user recognition and confirmation method according to the embodiment of the present disclosure.

Referring to FIG. 4A, it shows another flow chart of the user recognition and confirmation method according to the embodiment of the present disclosure that may be arranged between the Steps $S_{21}$ and $S_{22}$ of FIG. 4 so as to identify whether there is a user appearing in the first image frame F1 (Step $S_{211}$). When there is no user appearing in the first image frame F1, the process returns to the Step $S_{21}$ to capture a new first image frame F1. When there is a user appearing in the first image frame F1, the face recognition unit 12 starts to recognize a user ID according to the first image frame F1.

Figure 4B:
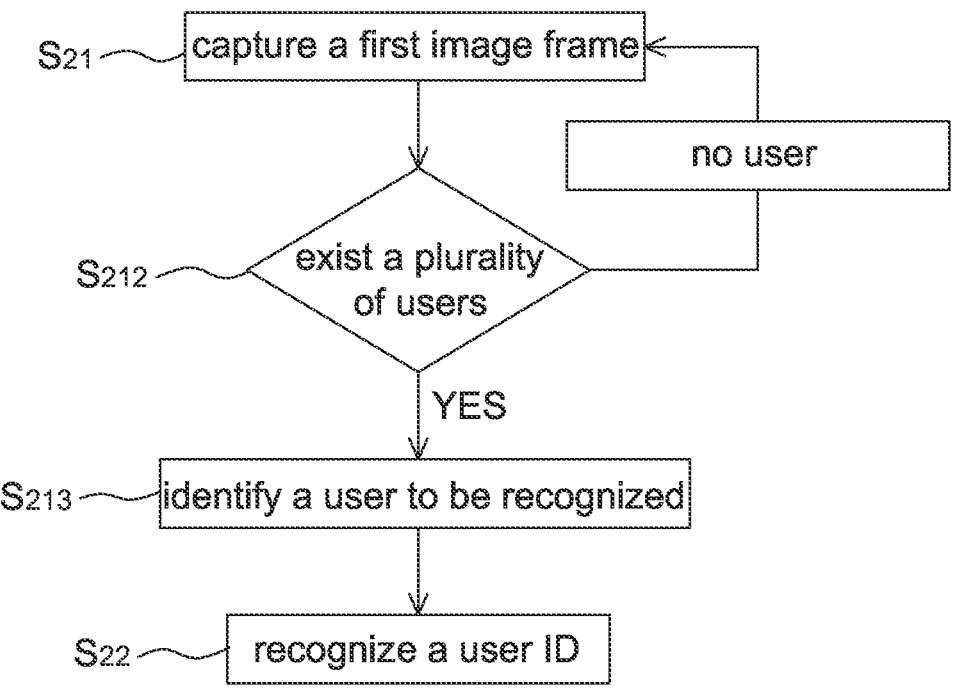

Referring to FIG. 4B, it shows another flow chart of the user recognition and confirmation method according to the embodiment of the present disclosure that may be arranged between the Steps $S_{21}$ and $S_{22}$ of FIG. 4 so as to identify whether there are a plurality of users appearing in the first image frame F1 (Step $S_{212}$). When there is no user appearing in the first image frame F1, the process returns to the Step $S_{21}$ to capture a new first image frame F1. When there are a plurality of users appearing in the first image frame F1, the face recognition unit 12 identifies a user to be recognized within the plurality of users in the first image frame F1 at first (Step $S_{213}$) and then recognizes a user ID of the user to be recognized (Step $S_{22}$), wherein as mentioned above the user to be recognized may be identified according to a user distance or a user position.

Figure 5:
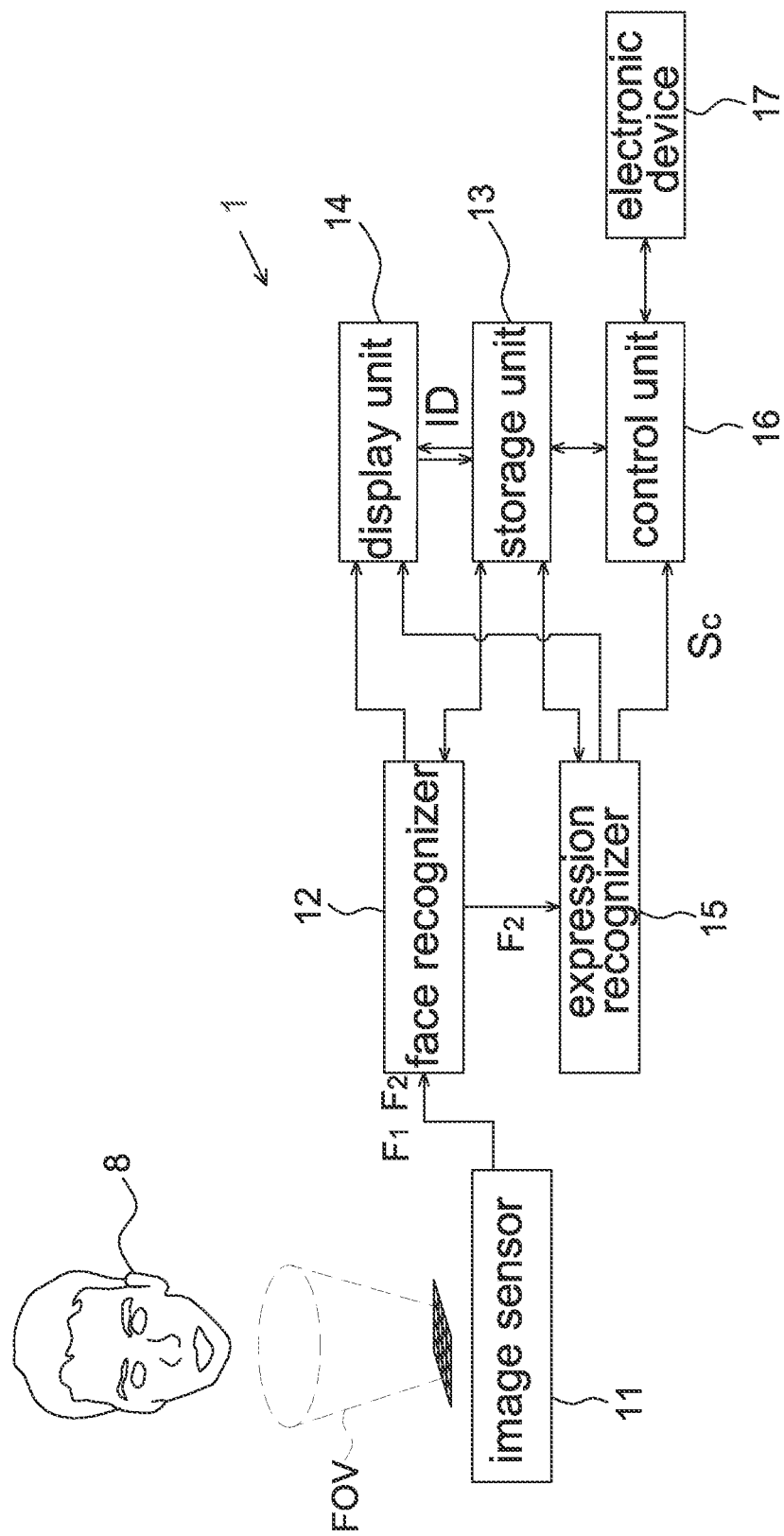
FIG. 5 shows a schematic block diagram of the user recognition and confirmation device according to another embodiment of the present disclosure.

Referring to FIG. 5, it shows a schematic block diagram of the user recognition and confirmation device according to another embodiment of the present disclosure. The difference between FIG. 5 and FIG. 1 is that in FIG. 5 the second image frame F2 is firstly transmitted to the face recognition unit 12 and then transmitted to the expression recognition unit 15, and other parts are similar to FIG. 1. For example in one embodiment, after the display unit 14 has shown the ID information, the face recognition unit 12 sends the second image frame F2 to the expression recognition unit 15. In another embodiment, when the face recognition unit 12 informs the display unit 14 to show the ID information, the image frame captured by the image sensing unit 11 (i.e. the second image frame F2) is sent to the expression recognition unit 15, and the expression recognition may be performed at the same time the display unit 14 is showing the ID information or after the ID information has been shown. In another embodiment, the face recognition unit 12 and the expression recognition unit 15 may perform respective recognition operations using the same image frame; i.e. the first image frame F1 and the second image frame F2 may be the same image frame.

As mentioned above, the conventional face recognition technology and the expression recognition technology use different algorithms and have different applications. Therefore, the present disclosure further provides a user recognition and confirmation device (FIG. 1) and a user recognition and confirmation method (FIG. 4) that may confirm whether the user ID is correct or not through the user expression and may be applied to the central control system for vehicles so as to eliminate the inconvenience caused by different driver settings associated with different drivers.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A vehicle device setting method, comprising:
   capturing, by an image sensing unit, a first image frame;
   recognizing a user ID according to the first image frame;
   playing ID information of the recognized user ID by a speaker;
   capturing, by the image sensing unit, a second image frame;
   generating a confirm signal when a first user expression is recognized by calculating an expression feature in the second image frame and comparing the recognized expression feature with stored expression data associated with a predetermined user expression to confirm whether the recognized user ID is correct or not according to the second image frame captured after the ID information is played by the speaker;
   controlling an electronic device according to the confirm signal; and
   entering a data update mode instructed by the user and updating setting information of the electronic device by current electronic device setting according to a saving signal generated by confirming a second user expression in a third image frame captured by the image sensing unit after the user ID is confirmed through playing the ID information by the speaker.

2. The vehicle device setting method as claimed in claim 1, wherein
   the electronic device comprises at least one of a seat, a mirror, an air conditioner, an audio equipment, a light and a GPS system.

3. The vehicle device setting method as claimed in claim 1, further comprising:
   identifying whether there is a user in the first image frame; and
   capturing another first image frame when there is no user in the first image frame.

4. The vehicle device setting method as claimed in claim 1, further comprising:
   identifying a user to be recognized within a plurality of users in the first image frame,
   wherein the user to be recognized is identified according to user distances of the plurality of users.

5. The vehicle device setting method as claimed in claim 1, further comprising:
   identifying a user to be recognized within a plurality of users in the first image frame,
   wherein the user to be recognized is identified according to user positions of the plurality of users in the first image frame.

6. The vehicle device setting method as claimed in claim 1, wherein the first image frame, the second image frame and the third image frame are captured by the image sensing unit at different times.

7. The vehicle device setting method as claimed in claim 6, wherein the first user expression and the second user expression are expressions at various times.

8. The vehicle device setting method as claimed in claim 1, wherein the first user expression and the second user expression are expressions at different times.

9. The vehicle device setting method as claimed in claim 1, wherein the ID information is previously stored in a storage unit.

10. The vehicle device setting method as claimed in claim 1, wherein the user ID is recognized only when the first image frame contains a face image.

* * * * *